US007055885B2

(12) United States Patent
Ishihara et al.

(10) Patent No.: US 7,055,885 B2
(45) Date of Patent: Jun. 6, 2006

(54) OPENING AND CLOSING APPARATUS

(75) Inventors: Hidenori Ishihara, Kosai (JP); Takeshi Hattori, Wako (JP); Masahiro Tanigawa, Wako (JP); Kazuya Shibata, Wako (JP); Tatsuo Chiura, Wako (JP); Ryoji Araki, Wako (JP)

(73) Assignees: Asmo Co., Ltd., Shizuoka-ken (JP); Honda Giken Kogyo Kabushiki Kaisha, Tokyo (JP)

( * ) Notice: Subject to any disclaimer, the term of this patent is extended or adjusted under 35 U.S.C. 154(b) by 344 days.

(21) Appl. No.: 10/669,627

(22) Filed: Sep. 25, 2003

(65) Prior Publication Data

US 2004/0107640 A1 Jun. 10, 2004

(30) Foreign Application Priority Data

Oct. 1, 2002 (JP) ............................ 2002-288717

(51) Int. Cl.
*B60J 5/10* (2006.01)
*H01H 3/16* (2006.01)
*E05F 15/02* (2006.01)

(52) U.S. Cl. .............................. 296/146.4; 296/146.8; 296/146.9; 49/28; 200/61.43

(58) Field of Classification Search ............. 296/146.8, 296/146.4, 146.9, 155; 49/26–28, 197; 200/61.43
See application file for complete search history.

(56) References Cited

U.S. PATENT DOCUMENTS 5,468,042 A * 11/1995 Heinrichs et al. ........ 296/146.4
6,739,198 B1 * 5/2004 Suzuki et al. ................. 73/753
6,772,559 B1 * 8/2004 Bouamra et al. .............. 49/26
6,779,302 B1 * 8/2004 Harrison et al. ............... 49/26
6,883,382 B1 * 4/2005 Ogino et al. .................. 73/756
6,912,912 B1 * 7/2005 Reichinger et al. ........... 73/800
6,917,002 B1 * 7/2005 Burgess et al. .......... 200/61.25

FOREIGN PATENT DOCUMENTS

JP 10-228837 6/1995
JP 9-318467 12/1997
JP 2001-280000 10/2001

* cited by examiner

*Primary Examiner*—D. Glenn Dayoan
*Assistant Examiner*—Greg Blankenship
(74) *Attorney, Agent, or Firm*—Steptoe & Johnson LLP

(57) ABSTRACT

An opening/closing apparatus including a trapping detection structure which reliably implements detection of trapping of foreign objects, even at a structure at which an outer peripheral edge of a moving body or an inner peripheral edge of an opening includes corner portions with small radii of curvature. A pressure sensor which detects external forces from directions intersecting a length direction thereof is provided at an outer periphery portion of a back door. However, at a corner portion, at a lower end portion of a door side portion or the like, the pressure sensor is provided with a large curvature such that the pressure sensor keeps distant from the corner portion. In place thereof, another pressure sensor, with a facing pair of electrode sheets, is provided along the corner portion. When one or more of these pressure sensors detects an external force, the back door is moved for opening.

10 Claims, 12 Drawing Sheets

OPENING AND CLOSING APPARATUS

CROSS-REFERENCE TO RELATED APPLICATION

This application claims priority under 35 USC 119 from Japanese Patent Application No. 2002-288717, the disclosure of which is incorporated by reference herein.

BACKGROUND OF THE INVENTION

1. Field of the Invention

The present invention relates to an opening and closing apparatus which opens and closes a gate by using a moving body, and relates to an excellent opening and closing apparatus for a sliding door, a back door or the like of a vehicle, which apparatus is driven by a motor.

2. Description of the Related Art

At sliding door apparatuses which are employed for opening and closing rear seat passenger entrances (gates) in vehicles such as station wagons, vans, sports utility vehicles and the like, there is a trend to using automatic sliding door apparatuses, in which a door panel is moved to open and close by a driving force of a motor or the like.

The vehicles mentioned above often have structures in which a "luggage room" and a passenger space for occupants are not partitioned but unified. In such a vehicle, a back door which rotates about an axis, whose axial direction is substantially in the vehicle width direction, at an upper end vicinity of the vehicle may be provided to correspond to a rear gate. The back door rotates upward and downward, and thus the rear gate opens and closes.

With such back door apparatuses, operations of opening and closing the back door have hitherto been carried out by manual operations. However, because the back door is moved to the upper side of the vehicle when the rear gate is in the open state, operation when the rear gate is to be closed is troublesome. In particular, the operation of closing the back door is arduous if the person carrying out the opening and closing operations is short in stature. Accordingly, there have been earnest demands for automatic opening and closing using driving force of a motor or the like, similarly to sliding doors. (Refer to Japanese Patent Application Laid-Open (JP-A) No. 2001-280000 for an example of a structure which opens and closes a back door by driving force of a motor.)

In accordance with the automation of opening and closing operations of back doors as described above, redeployment of trapping detection devices, which have hitherto been employed for detecting foreign objects trapped by door panels in automatic sliding door apparatuses, in the automatic back door apparatuses has been considered.

At a trapping detection device assembled to an automatic sliding door apparatus, a pressure sensor is disposed along an end portion at a closing direction side of a door panel. If the door panel traps a foreign object between the door panel and an inner periphery portion of the passenger opening while moving to close, and the door panel applies pressure to the foreign object, a reactive pressure force from the foreign object is detected by the pressure sensor.

Among such pressure sensors, a pressure sensor in which long strip-form electrode sheets are disposed to oppose one another across a gap is typical (below, this type of pressure sensor is referred to as a "facing sensor" where appropriate). The exteriors of these electrode sheets are covered with rubber or the like except at the gap between the electrode sheets. (Refer to JP-A No. 9-318467 for an example of a facing sensor.)

In contrast, there is also a pressure sensor in which long cord-form electrode wires which are wound helically, with a length direction being an axial direction of the helical form, are disposed to oppose one another across a gap, in a direction intersecting the length direction (below, this kind of sensor is referred to as a "helical sensor" where appropriate). (Refer to JP-A No. 10-228837 for an example of a helical sensor.)

In vehicles such as vans, sports utility vehicles and the like, the external outlines of back doors are becoming more complex for various reasons, such as improving the appearance of the vehicle, increasing rear illumination from brake lamps and the like which are disposed at both sides of a rear portion of the vehicle, and the like. In particular, a back door is formed such that a boundary between the back door and a main body portion of the vehicle at an upper portion of the back door relative to a vertical direction central portion of the vehicle, which boundary is located at an upper side relative to a lamp housing which accommodates a rear illuminator, is formed so as to face outward in the width direction of the vehicle.

In contrast, at a lower side relative to the above-mentioned central portion, the back door is positioned between lamp housings at both sides of the vehicle. Here, the back door is formed such that the boundary between the main body portion of the vehicle and the back door faces rearward of the vehicle.

As described above, structures have emerged in which the external outline of the back door is inflected in three dimensions, in addition to which a large number of angle portions are present. (Please refer to FIGS. 1 to 7, which are used for description of an embodiment of the present invention, for details of the shape of such a back door.)

In the facing sensor described earlier, the facing direction is a single direction. Thus, if a facing sensor is disposed along the whole of the outer periphery portion of a back door with a structure in which the outer periphery portion is inflected in three dimensions, there will be portions at which the facing direction of the electrode sheets is not oriented in an opening/closing direction of the back door. Therefore, of pressure sensors, the facing sensor cannot be applied to this back door.

In contrast, in the case of a helical sensor, when an external force acts from a direction which is inclined relative to the length direction of the helical sensor, the sensor resiliently deforms, the electrode wires make contact, and the external force can be detected. Therefore, even with a back door with a structure whose outer periphery portion is three-dimensionally inflected, it is possible to dispose a helical sensor along the whole of the outer periphery portion.

However, because this helical sensor is a structure which detects an external force when the sensor is resiliently deformed by an external force and the electrode wires make contact as described above, if the helical sensor is disposed along the angle portions of the three-dimensionally inflected outer periphery portion of the backdoor, there is a possibility that the sensor will be inflected and resiliently deformed thereat, and that the electrode wires may make contact because of this resilient deformation.

Accordingly, with a back door structure whose outer periphery portion is inflected in three dimensions, it is extremely difficult to dispose a pressure sensor along the outer periphery portion.

SUMMARY OF THE INVENTION

An object of the present invention is to provide an opening and closing apparatus which includes a trapping detection mechanism capable of reliably carrying out detection of trapping of foreign objects even at a structure in which an angle portion with a small radius of curvature is present at an outer periphery portion of a moving body, an inner peripheral edge of a gate or the like.

In order to achieve the object described above, in accordance with one aspect of the present invention, an opening and closing apparatus is provided which includes: a body portion including a gate; a closer provided at the body portion and capable of opening and closing the gate; a first pressure sensor disposed along a peripheral edge of at least one of the gate and the closer, the first pressure sensor including a curved portion; a second pressure sensor disposed between the peripheral edge and the curved portion of the first pressure sensor; and a control apparatus which controls opening and closing of the closer in accordance with operation of at least one of the first pressure sensor and the second pressure sensor.

DETAILED DESCRIPTION OF THE INVENTION

Structure of First Embodiment

Figure 1:
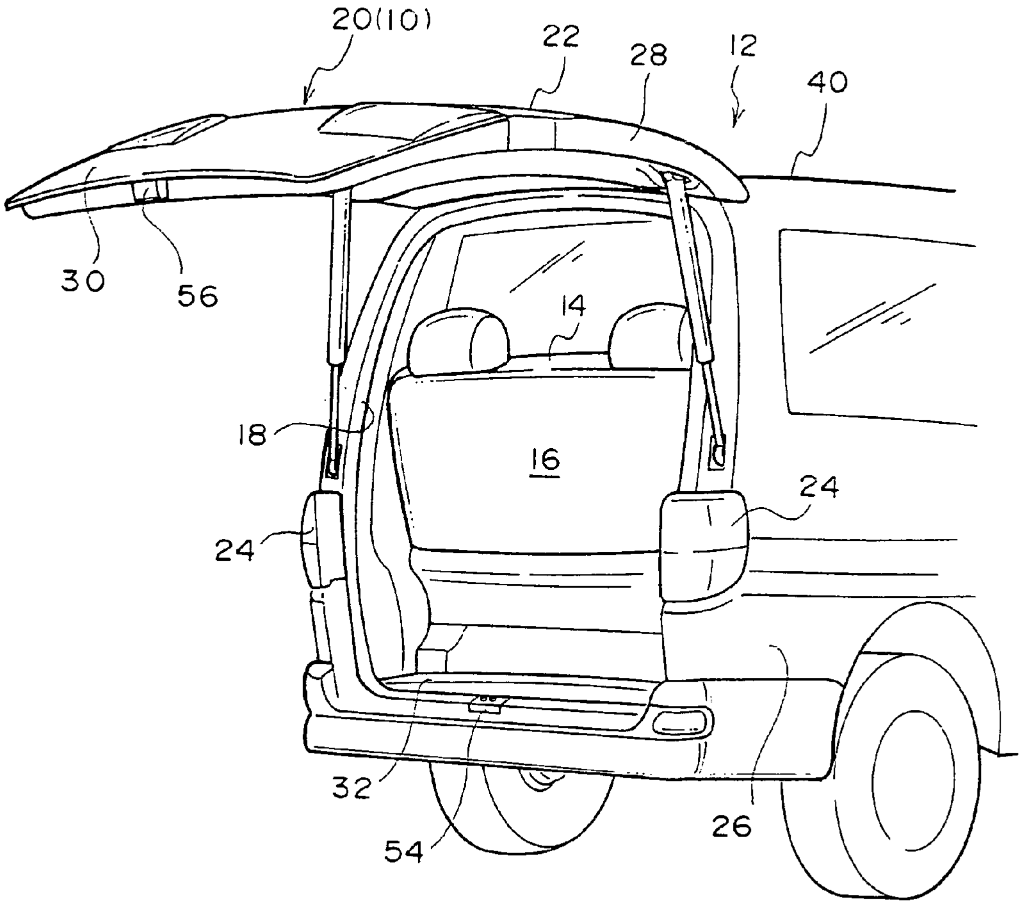
FIG. 1 is a perspective view, from behind, of a vehicle at which an opening and closing apparatus relating to a first embodiment of the present invention is applied.
Figure 2:
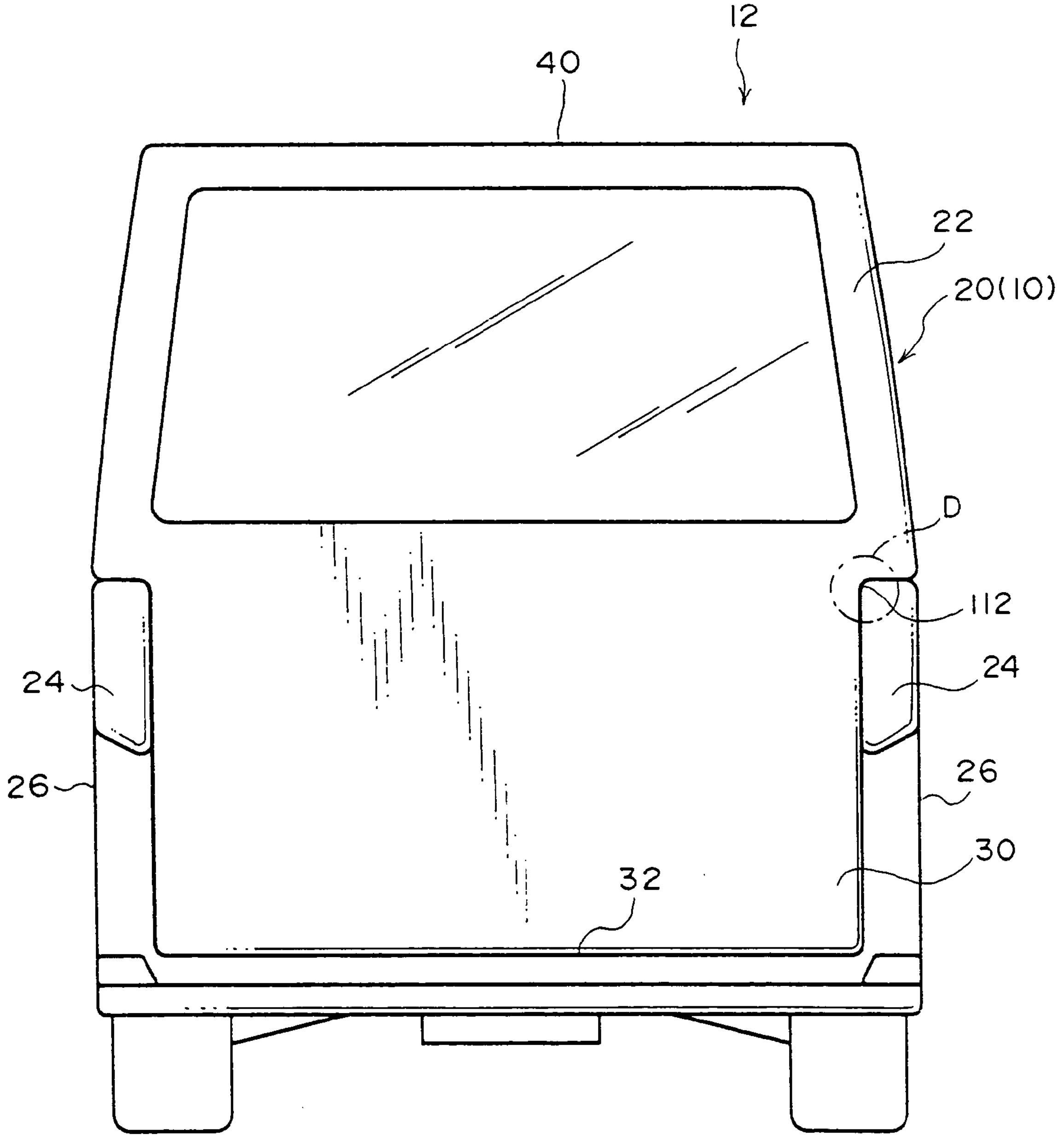
FIG. 2 is a rear elevational view of the vehicle at which the opening and closing apparatus relating to the first embodiment of the present invention is applied.
Figure 3B:
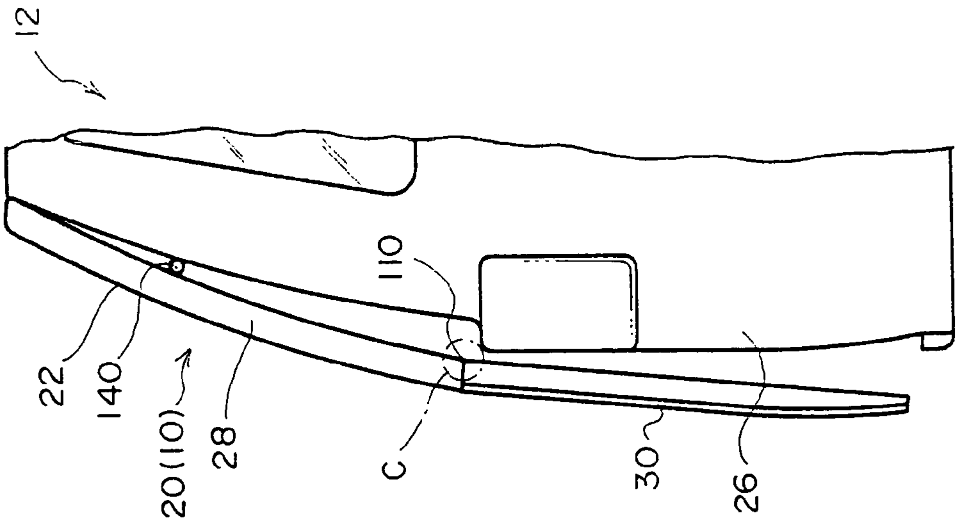
FIG. 3B is a side elevational view of the vehicle, showing a state in which the back door has trapped a foreign object.
Figure 3A:
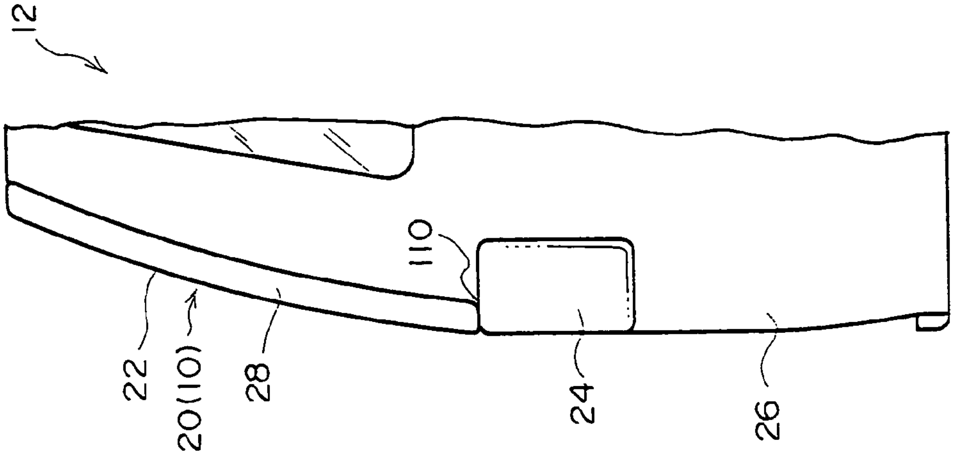
FIG. 3A is a side elevational view of the vehicle at which the opening and closing apparatus relating to the first embodiment of the present invention is applied, showing a state in which a back door, which is a moving body, is closed.

FIG. 1 shows a perspective view of a vehicle 12 to which an automatic back door apparatus 10 is applied as an opening and closing apparatus relating to a first embodiment of the present invention. FIG. 2 shows a rear view of the vehicle 12. FIGS. 3A and 3B show side views of the vehicle 12.

Structure of the Automatic Back Door Apparatus 10

As shown in FIG. 1, a rear gate 18, which serves as a gate portion, is formed at a rear end of the vehicle 12. A luggage room (trunk) 16 is disposed rearward relative to a rearmost section seat 14. The rear gate 18 is formed such that the luggage room 16 communicates with the outside of a cabin of the vehicle 12. Luggage and the like can be introduced through the rear gate 18 into the luggage room 16 from outside the cabin of the vehicle 12. Further, luggage and the like can be taken out through the rear gate 18 from the luggage room 16 to outside the cabin.

A back door 20 is provided at the vehicle 12 in correspondence with the rear gate 18. The rear gate 18 can be opened and closed by the back door 20.

Note that in the following descriptions, where positional relationships of members and portions are described with reference to the back door 20, a state in which the back door 20 completely closes the rear gate 18 serves as a reference state, unless particularly mentioned otherwise. The state in which the back door 20 completely closes the rear gate 18 is referred to simply as a fully closed state.

As shown in FIGS. 1 to 3B, the back door 20 is equipped with a door main body 22 with a thickness direction which is oriented substantially in a front-rear direction of the vehicle. The door main body 22 is formed such that, at an upper side relative to lamp housings 24 for unillustrated tail lamps, the shapes of vehicle width direction side end portions of the door main body 22 correspond with two side walls 26 of the vehicle 12, which are solid bodies at both ends of the vehicle width direction.

Further, as shown in FIGS. 3A and 3B, door side portions 28 are formed continuously with the two vehicle width direction end portions of the door main body 22. The door side portions 28 have forms which are inflected substantially to the vehicle forward direction relative to the door main body 22, with thickness directions set substantially along the vehicle width direction. In the fully closed state, front end portions of the door side portions 28 face rear end portions of the side walls 26, and lower end portions of the door side portions 28 face upper end portions of the lamp housings 24. Furthermore, the forms of surfaces of each of the door side portions 28 at outer sides in substantially the vehicle width direction (outer surfaces) are formed so as to be smoothly continuous, substantially along the front-rear direction of the vehicle, with outer surfaces of the side walls 26 in the fully closed state. Similarly, the forms of the outer faces of the door side portions 28 are formed so as to be smoothly continuous, substantially along the vertical direction of the vehicle, with outer surfaces of the lamp housings 24 in the fully closed state.

Meanwhile, as shown in FIG. 2, a door lower portion 30 is formed continuously with a lower end portion of the door main body 22. Similarly to the door main body 22, a thickness direction of the door lower portion 30 is set substantially along the vehicle front-rear direction. However, a dimension of the door lower portion 30 substantially along the vehicle width direction is shorter than the same dimension of the door main body 22, and is set to a length slightly smaller than a distance between the left and right lamp housings 24.

As described above, the door main body 22 is disposed at the upper side of the left and right lamp housings 24 in the fully closed state, and the door lower portion 30 is disposed between the left and right lamp housings 24 in the fully closed state. A surface substantially at the vehicle rearward side of the door lower portion 30 (an external surface) is formed so as to be smoothly continuous, substantially along the vehicle width direction, with substantially vehicle rear side surfaces of the lamp housings 24 in the fully closed state.

A lower end portion of the door lower portion 30 is disposed along a rear end of a floor panel 32 of the vehicle 12 at the rear gate 18. In the fully closed state, the lower end portion of the door lower portion 30 faces the floor panel 32 at the rear gate 18.

As described above, the back door 20 at which the two door side portions 28 and the door lower portion 30 are formed at the door main body 22 has a form in which an outer periphery portion thereof is inflected three-dimensionally.

In the descriptions hereabove, the back door 20 has been divided into the door main body 22, the door side portions 28 and the door lower portion 30 for convenience of explanation. However, as shown in FIGS. 4 to 7B, the back door 20 is basically structured by a single outer panel 34, which is disposed relatively at an exterior side of the vehicle 12, and a single inner panel 36, which is disposed at the vehicle 12 cabin interior side relative to the outer panel 34. Along an outer periphery portion of the inner panel 36, a hem portion 38, which is formed by folding over an outer periphery portion vicinity of the outer panel 34, is sandwichingly applied to the outer periphery portion vicinity of the inner panel 36. Thus, the outer panel 34 and the inner panel 36 are made integral.

The back door 20 with the structure described above is attached by an unillustrated hinge which is provided at a roof panel 40. Because of the hinge, the back door 20 is rotatable through a predetermined angle about an axis whose axial direction is the width direction of the vehicle 12. The back door 20 fully closes the rear gate 18 (the state illustrated in FIG. 3A) when the back door 20 is rotated as far as possible to the lower side of the vehicle 12.

A back door motor 42 (see FIG. 11), which serves as a driving device, is accommodated between the roof panel 40 and a roof head lining (not shown), which is provided at an underside of the roof panel 40. A drive section of the back door motor 42 is mechanically coupled with the back door 20 via speed reduction means and coupling means such as wires, pulleys, coupling gears and the like (none of which are shown). The back door 20 is rotated in a direction of opening the rear gate 18 by forward-driving, and the back door 20 is rotated in a direction of closing the rear gate 18 by reverse-driving.

Figure 11:
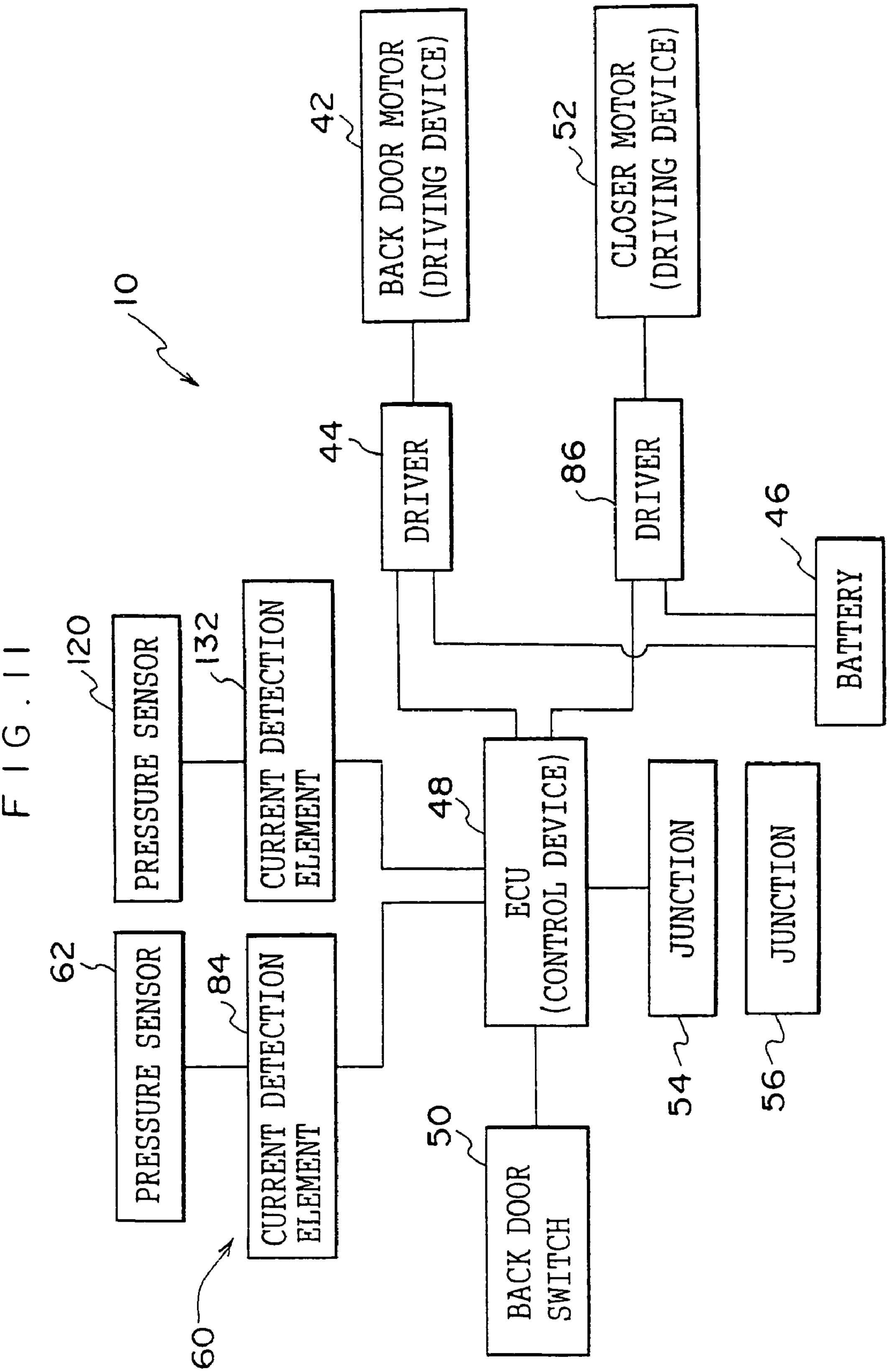
FIG. 11 is a block diagram showing schematics of a system of the opening and closing apparatus relating to the first embodiment of the present invention.

As shown in FIG. 11, the back door motor 42 is electrically connected to a battery 46 via a driver 44 for controlling the back door motor 42, which is mounted at the vehicle 12. The back door motor 42 is driven by electric power supplied from the battery 46. The back door motor 42 is also electrically connected to an ECU (electronic control unit) 48, which serves as a control device, via the aforementioned driver 44. The back door motor 42 is further electrically connected to a back door switch 50, which serves as an operation device, via the ECU 48.

The back door switch 50 is disposed at a vicinity of a driver (not shown) of the vehicle 12, a vicinity of the rear portion seat 14 or the like. When the back door switch 50 is operated, an operation signal (an electronic signal) from the back door switch 50 is inputted at the ECU 48. Accordingly, the ECU 48 controls the driver 44 on the basis of this operation signal, and the driver 44 forward-drives, reverse-drives or stops the back door motor 42.

A closer motor 52, which serves as a driving device structuring a closing assembly, is disposed at a rear end vicinity of an interior of the floor panel 32 of the vehicle 12. In addition to the closer motor 52, the closing assembly is equipped with a pair of junctions 54 and 56 (see FIG. 1).

Structure of Trapping Detection Device 60

Figure 4:
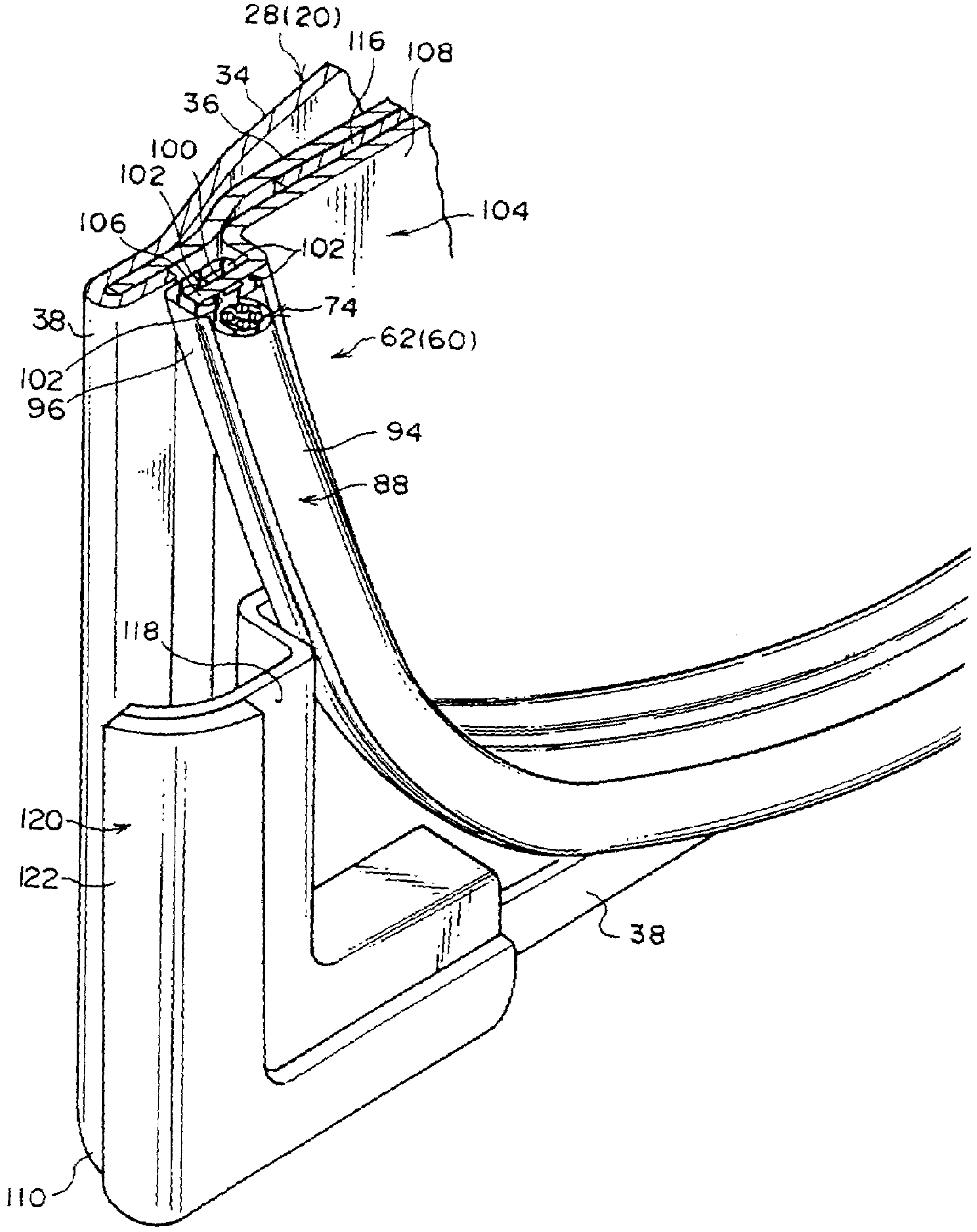
FIG. 4 is a perspective view, seen from inside a cabin of the vehicle, in which an angle portion of the back door at circle C of FIG. 3B is enlarged.
Figures 5A, 5B:
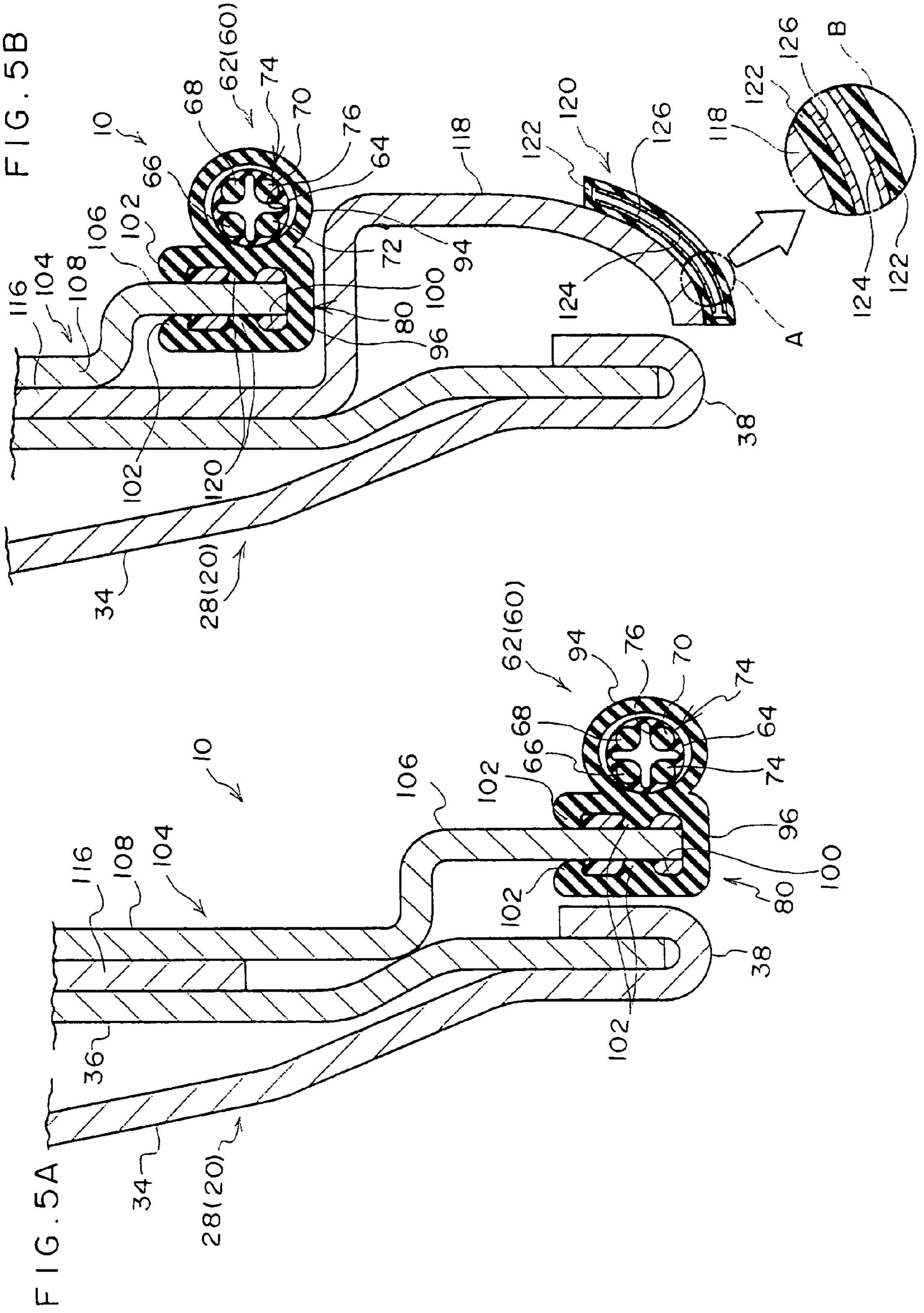
FIG. 5A is a sectional view of the back door at the circle C of FIG. 3B, showing a portion relatively above the angle portion.
FIG. 5B is a sectional view of the back door at the circle C of FIG. 3B, showing a vicinity of the angle portion. Circle B is an enlarged sectional view of the contents of circle A.

As shown in FIG. 4, which is an enlarged perspective view of circle C in FIG. 3B as viewed from the vehicle 12 cabin interior side, a pressure sensor 62 is provided at the door main body 22 to serve as a first pressure sensor structuring a trapping detection device 60. As shown in FIGS. 5A and 5B and, in more detail, FIG. 8, the pressure sensor 62 is provided with a sensor main body 74, which is structured by an outer skin portion 64 and four electrode wires 66, 68, 70 and 72.

Figure 9:
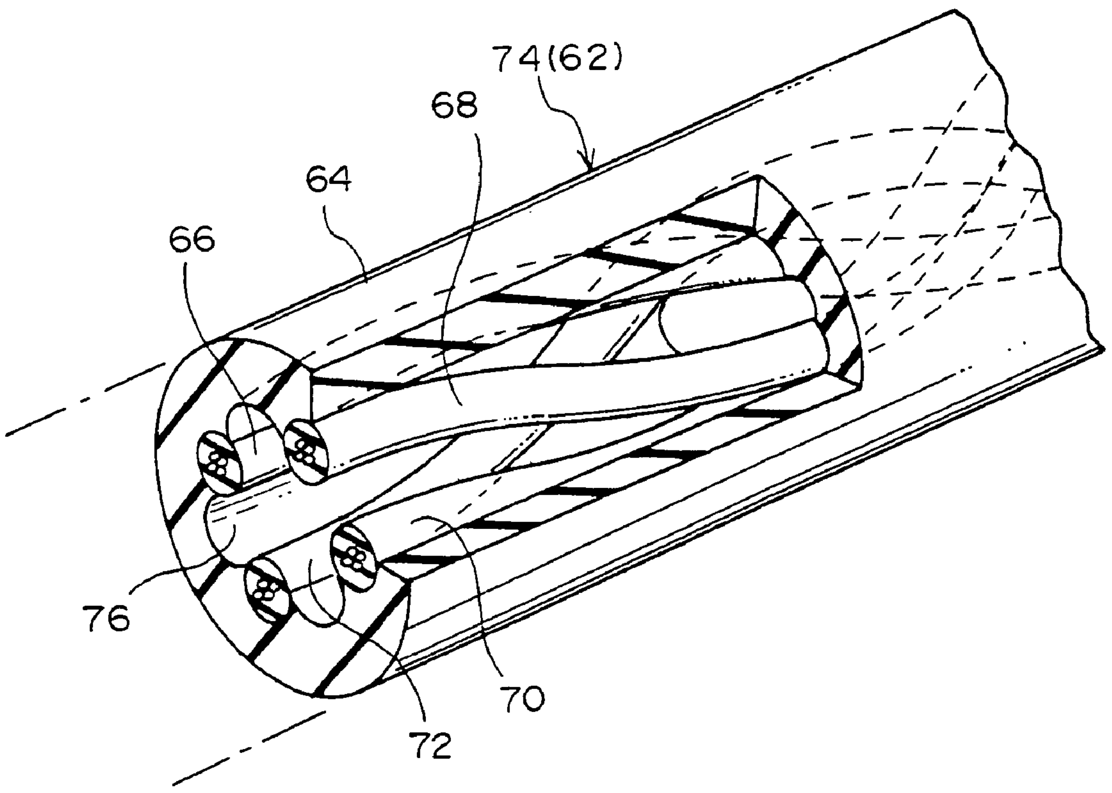
FIG. 9 is a partially cut away perspective view of a sensor main body of the first pressure sensor.

The outer skin portion 64 is formed in a long band form by an insulative resilient member of rubber, soft synthetic resin or the like, with a cross section cut in a direction intersecting the length direction thereof being substantially circular. A cross hole 76, with a cruciform shape in cross-section, is formed in the outer skin portion 64 along the length direction of the outer skin portion 64. As shown in FIG. 9, along the length direction of the outer skin portion 64, the cross hole 76 shifts gradually around the center of the outer skin portion 64. Thus, four end portions of the cross hole 76 (each end portion of the cruciform shape) are displaced in substantially helical forms along the length direction of the outer skin portion 64.

The electrode wires 66, 68, 70 and 72 are formed in flexible long cord forms by twisting together conductive filaments of copper wire or the like, and are covered with a conductive rubber. These electrode wires 66, 68, 70 and 72 are spaced from one another to sandwich the cross hole 76 at a central vicinity of the cross hole 76, and are disposed in helical forms along the cross hole 76. The electrode wires 66, 68, 70 and 72 are integrally fixed to an inner periphery portion of the cross hole 76.

Thus, the electrode wires 66, 68,70 and 72 are flexed when the outer skin portion 64 is resiliently deformed. In particular, if the outer skin portion 64 is resiliently deformed to such an extent that the cross hole 76 is crushed, the electrode wire 66 or the electrode wire 70 will make contact with the electrode wire 68 or the electrode wire 72 and conduct. Further, when the outer skin portion 64 returns to its original form, the electrode wires 66, 68, 70 and 72 return to their original forms.

Figure 10:
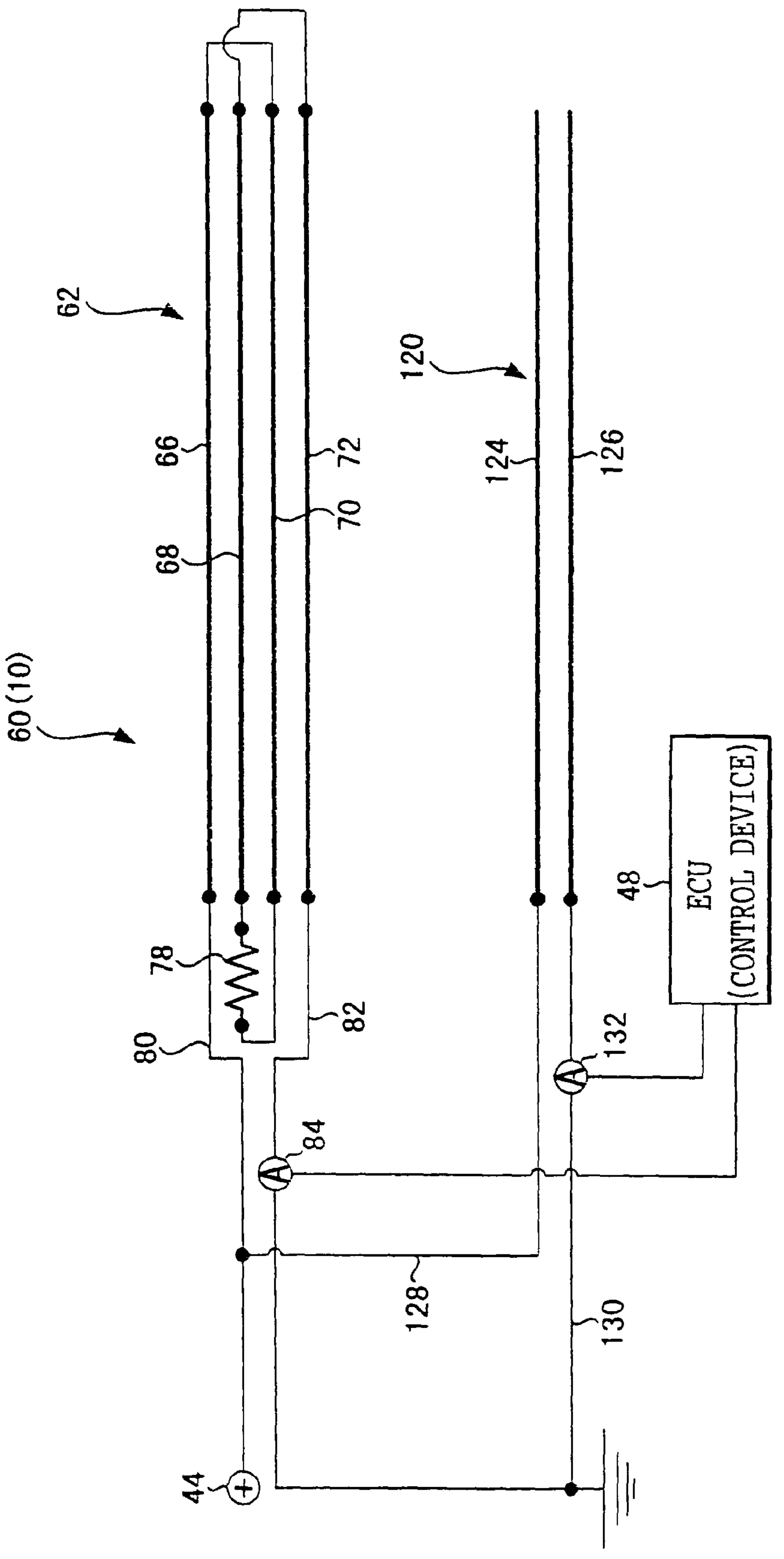
FIG. 10 is a schematic circuit diagram showing relationships between a control device and the first pressure sensor and a second pressure sensor of the opening and closing apparatus relating to the first embodiment of the present invention.

As shown in the circuit diagram of FIG. 10, the electrode wire 66 and the electrode wire 70 are conductively connected at one end of the sensor main body 74 in the length direction, and the electrode wire 68 and the electrode wire 72 are also conductively connected at the one end. The electrode wire 68 and the electrode wire 70 are serially connected, via a resistor 78, at the other length direction end of the sensor main body 74.

Further, one end in a length direction of the electrode wire 66 is electrically connected to the battery 46 via lead wiring 80 and other electrical connecting means, a sensor power supply control device for implementing power supply control, and the like.

In contrast, one end in a length direction of the electrode wire 72 is earthed via lead wiring 82, and other electrical connection means and the like. A current detection element 84 is connected to the lead wiring 82, or to the other unillustrated electrical connection means connected to the lead wiring 82. The current detection element 84 detects current flowing through the sensor main body 74. When the value of the current flowing through the sensor main body 74 changes from a predetermined value to another predetermined value, the current detection element 84 outputs a predetermined detection signal to the ECU 48.

Thus, when the electrode wire 66 or the electrode wire 70 contacts the electrode wire 68 or the electrode wire 72 and conducts, and an electronic signal is inputted to the ECU 48, the ECU 48 operates the driver 44 or a driver 86, which is interposed between the closer motor 52 and the battery 46, and forward-drives (which is to say, drives in a direction for lifting the back door 20) the back door motor 42 and the closer motor 52 by a predetermined amount.

Note that the driving amount when the back door motor 42 and the closer motor 52 are forward-driven is not particularly limited.

Figure 8:
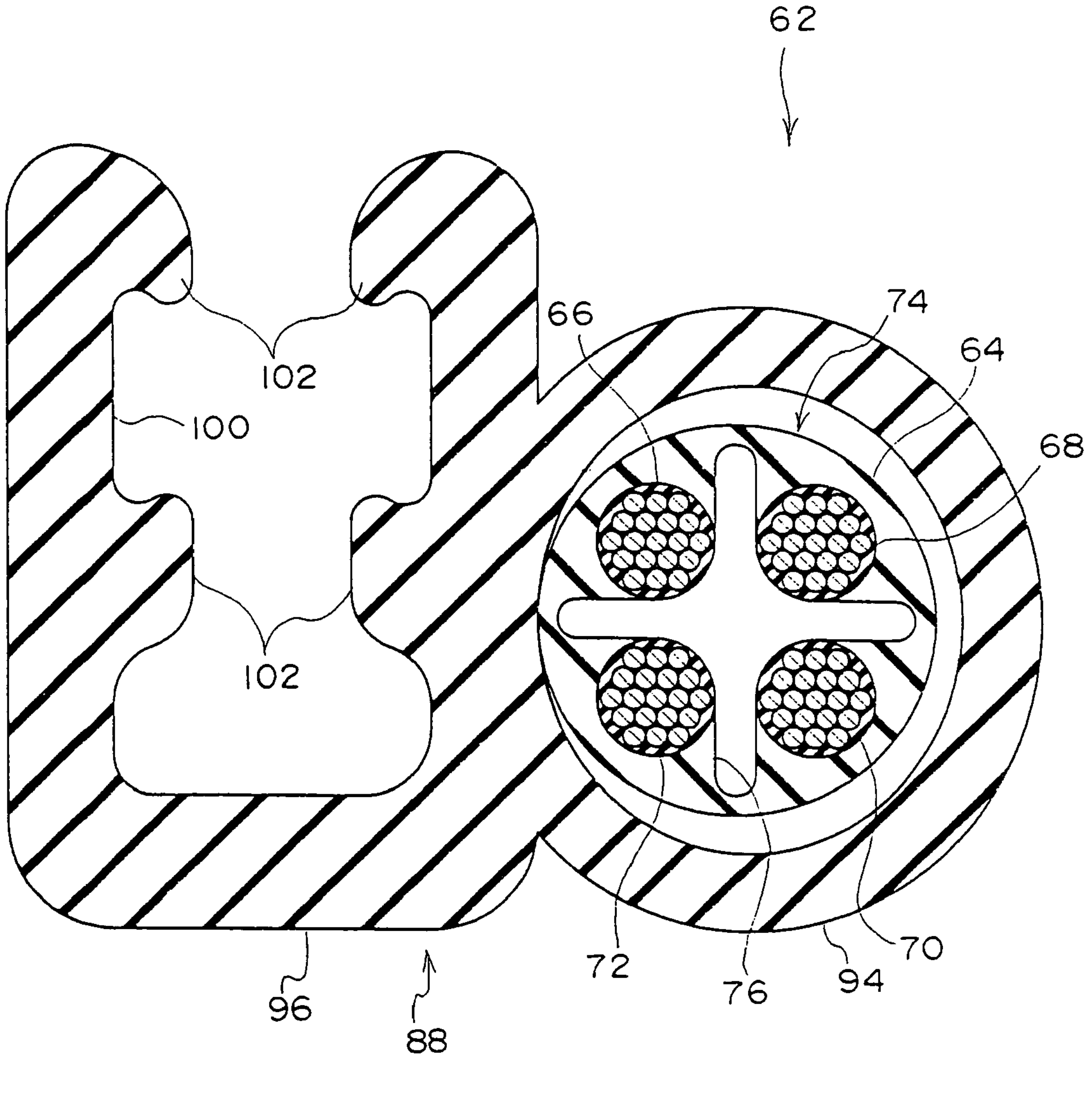
FIG. 8 is a cross-sectional view of a first pressure sensor.

As shown in FIG. 8, the pressure sensor 62 is equipped with a protector 88, which serves as a preservation element. The protector 88 is provided with a tube portion 94 formed of a rubber material or a synthetic resin material having a similar level of resilience to rubber materials. The tube portion 94 has a long, thin tube shape along the length direction of the pressure sensor 62. An inner peripheral shape of the tube portion 94 is made to be substantially circular, substantially elliptical or substantially ovoid. The sensor main body 74 is fitted into the tube portion 94.

An assembly portion 96 is formed continuously from the tube portion 94 at a side of the tube portion 94. The assembly portion 96 is formed of the same rubber material or synthetic resin material as the tube portion 94 so as to be a long band along the length direction of the tube portion 94. A cross-sectional shape of the assembly portion 96 is approximately a long rectangular shape. The tube portion 94 is joined to the assembly portion 96 at one end of the assembly portion 96 in a cross-sectional width direction thereof.

An assembly groove 100 is formed in the assembly portion 96. If the cross-sectional shape of the assembly portion 96 is regarded as a rectangle, the assembly groove 100 opens at an end portion at one end in the length direction of the cross-section of the assembly portion 96. A plurality of nipping pieces 102 are protrudingly formed at at least one (both in the present embodiment) of mutually opposing interior walls of the assembly groove 100. As shown in FIG. 5, a support portion 106, which serves as a first support portion of a bracket 104 which serves as a support device, is inserted into the assembly groove 100. Inside the assembly groove 100, the support portion 106 is resiliently nipped by the nipping pieces 102. A flat plate portion 108 of the bracket 104, which is formed continuously from the support portion 106 and is disposed to be parallel with the inner panel 36, is fixed to the inner panel 36. In this fixed state, an end portion of the support portion 106 and an end portion of a later-described support portion 118, which serves as a second support portion, are set to forms along the hem portion 38, which is to say forms so as to run along the outer periphery portion of the back door 20.

Therefore, in the state in which the bracket 104 is fixed to the inner panel 36, the sensor main body 74 is disposed along the hem portion 38. Note that the sensor main body 74 does not run along the hem portion 38 along the whole of the outer periphery portion of the back door 20. As shown in FIG. 4, the sensor main body 74 does not run along the hem portion 38 at a corner portion 110, which is at a region at which a front end portion and a lower end portion of the previously described door side portion 28 intersect. Rather, the sensor main body 74 is gently curved to an inner side relative to the outer peripheral portion of the back door 20, so as to be distant from the corner portion 110.

Figure 6:
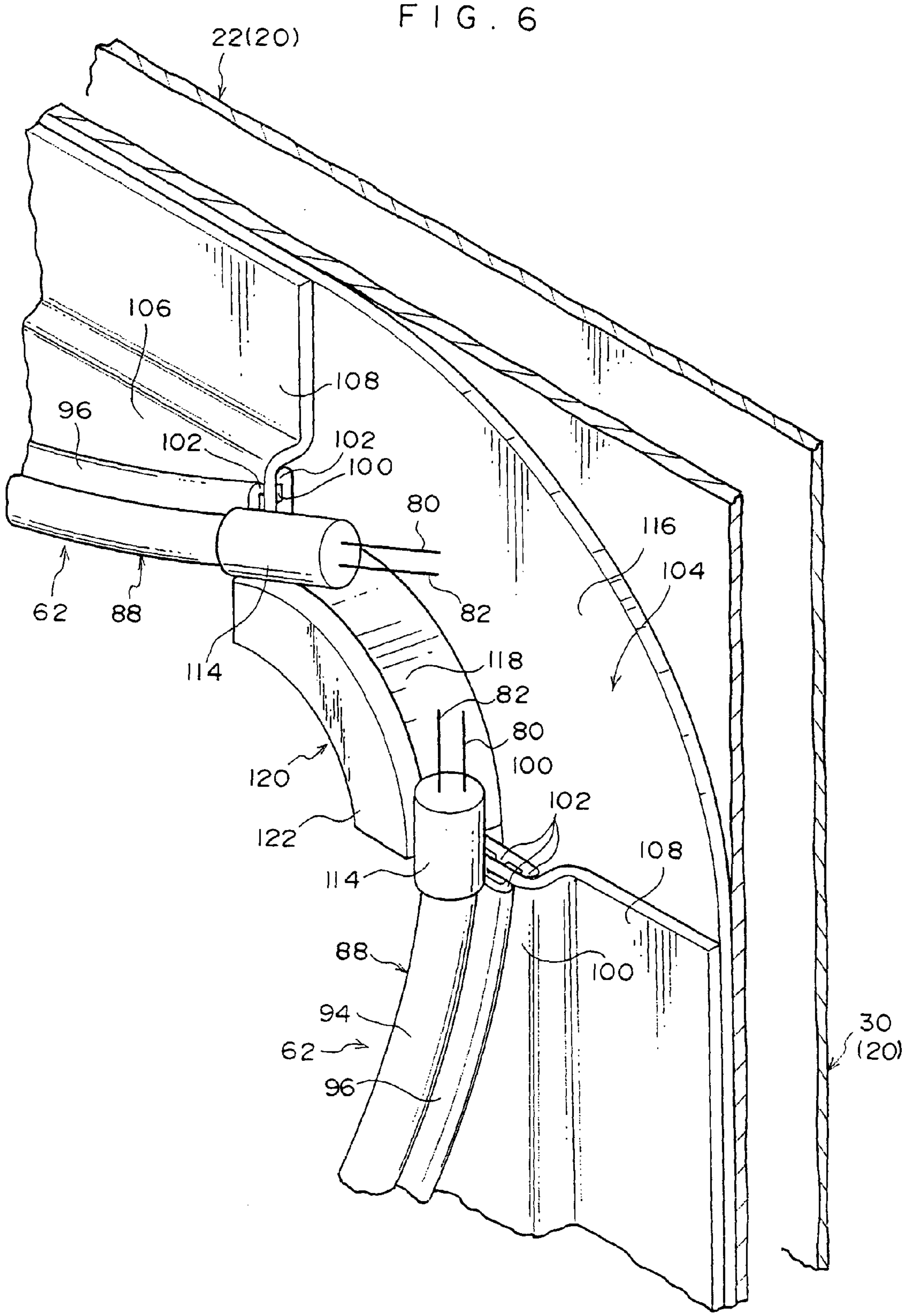
FIG. 6 is a perspective view, seen from inside the cabin of the vehicle, in which an angle portion at circle D of FIG. 2 is enlarged.

As shown in FIG. 6, which is an enlarged perspective view of the region shown by circle D in FIG. 2 as seen from the vehicle cabin interior side, the sensor main body 74 is split in a vicinity of a corner portion 112, which is at a region at which a lower end portion of the door main body 22 and a side end portion of the door lower portion 30 intersect. That is, in the present embodiment, the pressure sensor 62 which is assembled to the back door 20 is not a single piece, but a plurality of the pressure sensor 62 is disposed non-continuously along the hem portion 38. As shown in FIG. 6, in the vicinity of the corner portion 112, the sensor main body 74 of one pressure sensor 62 is disposed along the hem portion 38 at the lower end portion of the door main body 22 from a vehicle width direction outer side toward the inner side, and one end thereof is disposed short of reaching the corner portion 112. A termination portion 114 is provided at this one end. The termination portion 114 accommodates the resistor 78 mentioned earlier and the like (not shown in FIG. 6), and the lead wiring 80 and lead wiring 82 are led out from the termination portion 114.

Meanwhile, the sensor main body 74 of the other pressure sensor 62 in FIG. 6 is disposed along the hem portion 38 from a lower side of the door lower portion 30 toward the upper side, and one end portion thereof is disposed short of reaching the corner portion 112. Similarly to the one pressure sensor 62, another of the termination portion 114 is provided at this one end, and the lead wiring 80 and lead wiring 82 are led out from this termination portion 114.

As is shown in FIGS. 4 and 6, a flat plate portion 116 is provided between the aforementioned flat plate portion 108 of the bracket 104 and the inner panel 36. The flat plate portion 116 is integrally joined to the flat plate portion 108 by welding or the like, and structures a portion of the bracket 104. Note that, although in the present embodiment the flat plate portion 116 and the flat plate portion 108 are structured as separate bodies and made integral by joining with welding or the like, it is also possible to, for example, carry out bending of a single metal plate and structure the flat plate portion 108 from one side of the bent portion and the flat plate portion 116 from the other side of the bent portion.

As shown in FIGS. 4 and 5B, at a vicinity of a lower end portion of the front end side of the door side portion 28, the support portion 118 protrudes from a vicinity of a lower end portion of the flat plate portion 116 toward a distal end side of the hem portion 38 (substantially the vehicle front side in the fully closed state). At a portion of the support portion 118 along a substantially vehicle front side end portion of the door side portion 28, the support portion 118 is inflected from a distal end of the flat plate portion 116 substantially toward the vehicle width direction inner side, passes in front of the protector 88 (substantially at the vehicle forward side thereof in the fully closed state), and then inflects so as to gradually approach the hem portion 38. At an end portion of the door side portion 28 which is at the lower side relative to the corner portion 110, the support portion 118 turns substantially through 90 degrees, and is formed similarly along the hem portion 38 at the lower end portion of the door side portion 28.

A pressure sensor 120, which serves as a second pressure sensor, is provided at a surface of the support portion 118. As shown in circle B of FIG. 5B, in which the contents of circle A are enlarged, the pressure sensor 120 is provided with an outer skin portion 122 which is formed substantially in a plate shape of an insulative resilient material, such as rubber, a soft synthetic resin material or the like. The outer skin portion 122 is formed in a plate shape whose thickness direction is along a thickness direction of the support portion 118. At a portion of the outer skin portion 122 corresponding with the distal end side of the support portion 118, the outer skin portion 122 curves along the support portion 118. An interior portion of the outer skin portion 122 is made to be hollow. At an internal periphery portion of the outer skin portion 122, a pair of electrode sheets 124 and 126 are fixed in a state of opposing one another along the thickness direction of the outer skin portion 122.

As shown in the circuit diagram of FIG. 10, of these electrode sheets 124 and 126, the electrode sheet 124 is electrically connected to the battery 46 via lead wiring 128 and the lead wiring 80.

Meanwhile, the electrode sheet 126 is connected to earth via lead wiring 130 and the lead wiring 82. Further, a current detection element 132 is connected to the lead wiring 130, or to other unillustrated electrical connection means connected to the lead wiring 130. The current detection element 132 detects current flowing from the electrode sheet 126 into the lead wiring 130, and outputs a predetermined detection signal to the ECU 48 if electric current flows in the lead wiring 130.

Figure 7B:
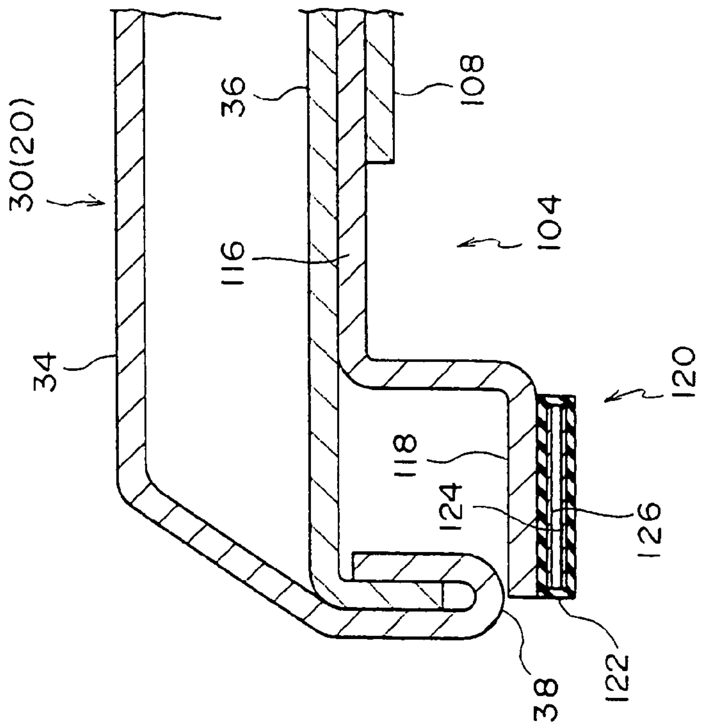
FIG. 7B is a sectional view of the back door at the circle D of FIG. 2, showing a vicinity of the angle portion.
Figure 7A:
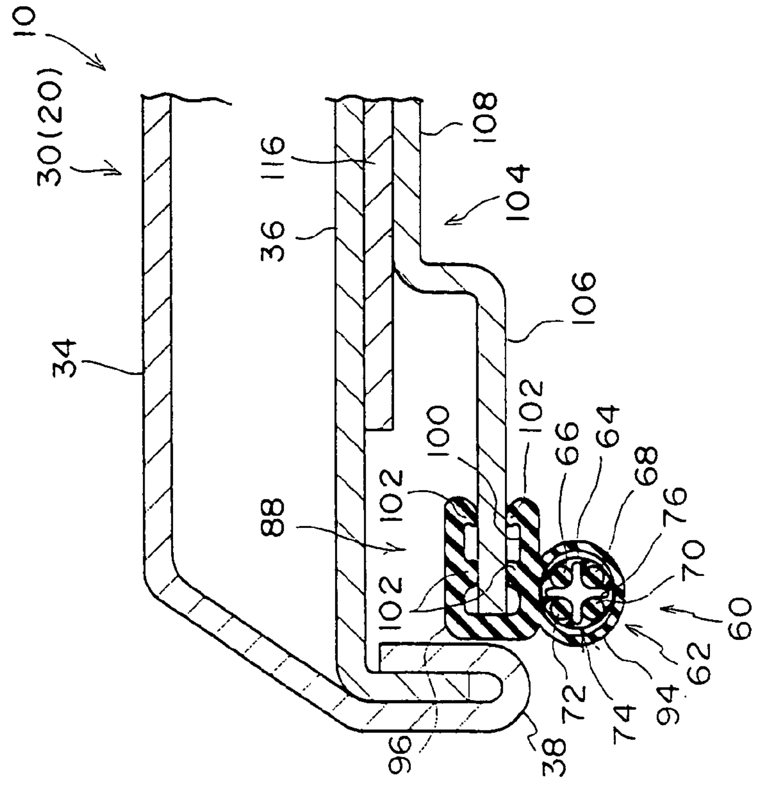
FIG. 7A is a sectional view of the back door at the circle D of FIG. 2, showing a portion relatively below the angle portion.

As shown in FIGS. 6 and 7B, another of the support portion 118 also protrudes from the flat plate portion 116 at a vicinity of the corner portion 112 between the lower end portion of the door main body 22 and the side portion of the door lower portion 30. This support portion 118 at the corner portion 112 is different from the support portion 118 at the corner portion 110 in that the thickness direction thereof is along the thickness direction of the back door 20 at the door main body 22 and the door lower portion 30. Although, as described above, the support portion 118 at the corner portion 110 curves so as to gradually approach the distal end (front end) of the hem portion 38 toward the vehicle forward side in the fully closed state, the support portion 118 at the corner portion 112 is not particularly curved.

At one thickness direction face of the support portion 118 at the corner portion 112 (a surface facing the vehicle 12 cabin interior side in the fully closed state), the pressure sensor 120 is fixed in a state in which the electrode sheets 124 and 126 run along the thickness direction of the support portion 118.

Operation and Effects of the Present Embodiment

Now, operations and effects of the present embodiment will be described.

In a state in which the back door 20 has been rotated to the upper side of the vehicle 12 and the rear gate 18 has been opened, when the back door switch 50 is operated for closing, the ECU 48 operates the driver 44 and the back door motor 42 reverse-drives. Accordingly, the back door 20 rotates toward the lower side of the vehicle 12.

Then, when the back door 20 has rotated to a state just before the rear gate 18 is fully closed, the junction 54 and the junction 56 (see FIG. 11) make contact and pass current. When the ECU 48 determines that the junctions 54 and 56 are conducting, the ECU 48 operates the driver 44 and stops the back door motor 42, and the driver 86 drives the closer motor 52. The closer motor 52 rotates the back door 20 to the fully closed position by driving force of the closer motor 52. In addition, lock means, such as a latch or the like, is operated and the back door 20 is locked in the fully closed state.

Thus, with the automatic back door apparatus 10 of the present embodiment, a closing operation of the back door 20 can be implemented simply by operating the back door switch 50. Therefore, there is no need for, for example, struggling to reach the back door 20 with a hand at the time of the closing operation of the back door 20, and the closing operation of the back door 20 can be carried out with ease.

Now, in the state in which the back door 20 has opened the rear gate 18, there may be cases in which a foreign body 140 is disposed so as to traverse an inside-outside direction of the vehicle 12 at a portion corresponding to an inner peripheral edge of the rear gate 18, that is, the rear ends of the side walls 26 of the vehicle 12, the upper faces and vehicle width direction inner side faces of the lamp housings 24, the rear end of the floor panel 32 and the like. For example, as shown in FIG. 3B, there may be a case in which the foreign body 140 is disposed so as to traverse the inside-outside direction of the vehicle 12 behind the rear end of one of the side walls 26 of the vehicle 12. In this case, when the back door 20 is rotated (moved for closing) so as to close the rear gate 18, the front end (i.e., the hem portion 38) of one of the door side portions 28 of the back door 20 will abut against the foreign body 140. As a result, the foreign body 140 may be trapped between the rear end of the side wall 26 and the front end of the door side portion 28.

In such a case, as shown in FIG. 3B, at an intermediate portion along the front end of the door side portion 28, that is, a portion at which the front end of the door side portion 28 is relatively straight along a vertical direction or gently curved with a curvature much broader than the corner portion 110 and corner portion 112, the tube portion 94 of the pressure sensor 62 is located sideward of a distal end vicinity of the hem portion 38. Consequently, when the hem portion 38 abuts against the foreign body 140 in accordance with the rotation of the back door 20, the tube portion 94 also abuts against the foreign body 140, and the tube portion 94 presses the foreign body 140 to the vehicle 12 cabin interior side in accordance with the closing movement (rotation) of the back door 20. When the tube portion 94 presses the foreign body 140, a reactive pressing force from the foreign body 140 acts on the tube portion 94 in accordance with that pressing force, and the tube portion 94 is resiliently deformed by this reactive pressing force.

The outer skin portion 64 inside the tube portion 94 is resiliently deformed by this resilient deformation of the tube portion 94, and the electrode wire 66 or the electrode wire 70 provided inside the outer skin portion 64 makes contact with the electrode wire 68 or the electrode wire 72 and shorts the circuit. At this time, electrical current does not flow through the resistor 78. Consequently, the ampage of the current flowing through the electrical circuit structured with the electrode wires 66, 68, 70 and 72 changes.

This change in the current value is detected by the current detection element 84, and a detection signal (an electronic signal) is outputted from the current detection element 84 which has detected the change in the current value to the ECU 48. The ECU 48 to which the detection signal is inputted judges that the outer skin portion 64 has been deformed, that is, that the trapping of the foreign body 140 has occurred, and the ECU 48 operates the driver 44 and the driver 86. The back door motor 42 and the closer motor 52 are forward-driven (that is, driven in a direction for lifting the back door 20). As a result, the trapping of the foreign body 140 by the back door 20 is released.

As mentioned earlier, the driving amount of the back door motor 42 and the closer motor 52 when the trapping of the foreign body 140 is thus detected is not particularly limited. Accordingly, the back door motor 42 and the closer motor 52 may be forward-driven so as to raise the back door 20 until the rear gate 18 is fully open. Further, a structure in which, for example, the back door motor 42 and closer motor 52 are forward-driven until the back door 20 is raised a few centimeters and then stopped is also possible.

In comparison with a structure in which the back door 20 is raised until the rear gate 18 is fully open when the trapping of the foreign body 140 is detected, a structure in which the back door 20 is raised a few centimeters is preferable in having the following advantages.

Specifically, in the case of a structure which raises the back door 20 until fully open when trapping of the foreign body 140 has been detected, the back door 20 rotates up to the position at which the rear gate 18 is fully open even after the trapping of the foreign body 140 has been released. Therefore, when the rear gate 18 is to be fully closed by the back door 20 again, it is necessary to wait until the back door 20 has fully rotated upward. Moreover, time is also required for the back door 20 to again rotate from the position to which it has fully rotated upward. Therefore, with such a structure, time is required for fully closing the rear gate 18 again.

Naturally, it is possible that an occupant or the like could stop the back door 20 during lifting and lower the back door 20 again by suitably operating the back door switch 50. However, in such a case, an operation to stop the raising of the back door 20 is necessary. Thus, operation is troublesome.

By contrast, it is also possible, when trapping of the foreign body 140 is detected, to basically release the trapping of the foreign body 140 and withdraw the foreign body 140 when the back door 20 has been raised by a few centimeters. Here, when the back door 20 has stopped in the state in which the back door 20 has been raised by the few centimeters, a required rotation amount of the back door 20 for fully closing the rear gate 18 from this state may be small in comparison to the situation in which the back door 20 is fully raised. Therefore, when the rear gate 18 is to be fully closed again, the rear gate 18 can be fully closed in a short time.

In the present embodiment, as described above, the pressure sensor 62 is disposed along the hem portion 38 at the door side portions 28 in a state of being broadly curved in the vicinity of the corner portion 110, so as to keep away from the corner portion 110. Moreover, the pressure sensor 62 is split in the vicinity of the corner portion 112. That is, in the present embodiment, the pressure sensor 62 is not disposed very close to the corner portions 110 and 112. However, trapping of the foreign body 140 at the corner portions 110 and 112 is a clear possibility.

Now, as described earlier, in the present embodiment the pressure sensors 120 are provided along the corner portion 110 and the corner portion 112. If, for example, the foreign body 140 is trapped at the corner portion 110, the corner portion 110 will press against the foreign body 140. Because the pressure sensor 120 fixed to the support portion 118 of the bracket 104 is disposed sideward of the corner portion 110, the outer skin portion 122 of the pressure sensor 120 will press against the foreign body 140 in accordance with the rotation (closing movement) of the back door 20.

The support portion 118 in the vicinity of the corner portion 110 is curved so as to gradually approach toward the distal end side of the hem portion 38 at the corner portion 110, and the pressure sensor 120 assembled to this support portion 118 is also curved thus. Accordingly, at the vicinity of the distal end of the hem portion 38, the thickness direction of the support portion 118 is inclined substantially to the vehicle front-rear direction rather than the thickness direction of the door side portion 28 (i.e., substantially the vehicle width direction). Therefore, a pressing direction when the outer skin portion 122 presses against the foreign body 140 is a direction which is angled substantially to the vehicle front-rear direction rather than the thickness direction of the door side portion 28. Accordingly, a reactive pressing force that the outer skin portion 122 receives from the foreign body 140 in accordance with the pressure at this time includes a component substantially in the vehicle rearward direction. As a result, this vehicle rearward direction component of the reactive pressing force presses the outer skin portion 122 in the thickness direction thereof.

Hence, when the reactive pressing force presses the outer skin portion 122 in the thickness direction thereof, the outer skin portion 122 is resiliently deformed. The electrode sheets 124 and 126 inside the outer skin portion 122 contact one another because of this reactive deformation, and pass current.

When the electrode sheets 124 and 126 conduct thus, electric current flows to the lead wiring 130 through the lead wiring 80, the lead wiring 128, the electrode sheet 124 and the electrode sheet 126. The current that has flowed to the lead wiring 130 is detected by the current detection element 132. When the current detection element 132 detects the electrical current flowing in the lead wiring 130, the detection signal is outputted from the current detection element 132 and inputted to the ECU 48. When the detection signal from the current detection element 132 is inputted at the ECU 48, it is judged that the outer skin portion 122 has deformed, that is, that trapping of the foreign body 140 at the corner portion 110 has occurred. The ECU 48 operates the driver 44 and/or the driver 86, and forward-drives the back door motor 42 and/or the closer motor 52 (that is, drives in the direction for raising the back door 20). Accordingly, the trapping of the foreign body 140 by the back door 20 is released.

Further, because the pressure sensor 120 as described above is also provided at the corner portion 112, similar operations can be performed in a case in which trapping of the foreign body 140 at the corner portion 110 occurs, and similar effects can be obtained.

Now, as mentioned earlier, the support portion 118 at the corner portion 112 does not curve toward the hem portion 38 side in the manner of the support portion 118 at the corner portion 110.

However, the thickness direction of the door main body 22 at the corner portion 112 and the thickness of the door lower portion 30 are approximately along the rotation direction of the back door 20. Accordingly, the thickness direction of the support portion 118 at the corner portion 112 also runs along the rotation direction of the back door 20, and the thickness direction of the outer skin portion 122 of the pressure sensor 120 assembled to the support portion 118 also runs approximately along the rotation direction of the back door 20. Thus, even though the support portion 118 at the corner portion 112 is not curved, the electrode sheets 124 and 126 thereat can be made to face one another in the direction of rotation of the back door 20, which is to say, the direction in which the foreign body 140 is pressed when the foreign body 140 is trapped.

As described above, in the present embodiment, at a time at which the back door 20 is moving to close (rotating) and traps the foreign body 140, at least one of the pressure sensors 62 and the pressure sensors 120 detects a reactive pressing force from the foreign body 140 and, on the basis thereof, the back door 20 is reverse-driven (moved to open). Consequently, trapping of the foreign body 140 can be reliably prevented.

Further, if the pressure sensor 62 were to be forcibly run along at a position at which the outer periphery portion is curved, such as the corner portion 110, the corner portion 112 or the like, an excessive resilient deformation could occur at the outer skin portion 64, and hence the electrode wires 66, 68, 70 and 72 inside the outer skin portion 64 might make contact. However, in the present embodiment, the pressure sensor 62 is assembled in a state of being broadly curved so as to keep away from the corner portion 110. Moreover, the pressure sensor 62 is split in the vicinity of the corner portion 112. Therefore, the problem described above will not occur, and detection of a reactive pressing force from the foreign body 140 can be carried out reliably by the pressure sensor 62.

As is also described above, the pressure sensor 62 is not disposed along the hem portion 38 at the corner portion 110 and the corner portion 112. Instead, the pressure sensors 120 are provided along the hem portion 38 at the corner portions 110 and 112 in place of the pressure sensor 62. Consequently, trapping of the foreign body 140 at the corner portion 110 or the corner portion 112 can be reliably detected.

Further still, because the pressure sensor 120 is a structure which detects a reactive pressure force from the foreign body 140 by the electrode sheets 124 and 126, which face one another across a gap, making contact and conducting, an external force that excludes a component along the facing direction of the electrode sheets 124 and 126 cannot be detected. However, because the present embodiment is a structure in which the individual pressure sensors 120 are disposed at the corner portion 110 and the corner portion 112, at least the facing direction of the electrode sheets 124 and 126 can be angled substantially to the vehicle front-rear direction rather than the vehicle width direction. Accordingly, a reactive pressing force from the foreign body 140 can be received in the thickness direction of the outer skin portion 122, and reactive pressing forces from the foreign body 140 can be detected reliably.

As described above, in the present embodiment, because of the pressure sensor 62 and the pressure sensors 120, even though the back door 20 has a structure including the corner portion 110, the corner portion 112 and the like, that is, a structure which is inflected three-dimensionally, the present embodiment has excellent effects in being able to reliably detect trapping of the foreign body 140 and prevent trapping of the foreign body 140.

Further, in the present embodiment, the support portion 106 supporting the pressure sensor 62 and the support portions 118 supporting the pressure sensors 120 are made integral. Therefore, relative positioning of the pressure sensor 62 and the pressure sensors 120 can be carried out with ease by assembling the pressure sensor 62 and pressure sensors 120 to the support portion 106 and support portions 118, respectively, before the bracket 104 is assembled to the back door 20. Moreover, by assembling the bracket 104 to the back door 20, both the pressure sensor 62 and the pressure sensors 120 can be assembled to the back door 20 at one time. Consequently, ease of working for assembly operations of the pressure sensor 62 and the pressure sensors 120 can be improved.

Second Embodiment

Now, a second embodiment of the present invention will be described. Note that portions that are substantially the same as in the first embodiment are given the same reference numerals, and descriptions thereof are omitted.

Figure 12:
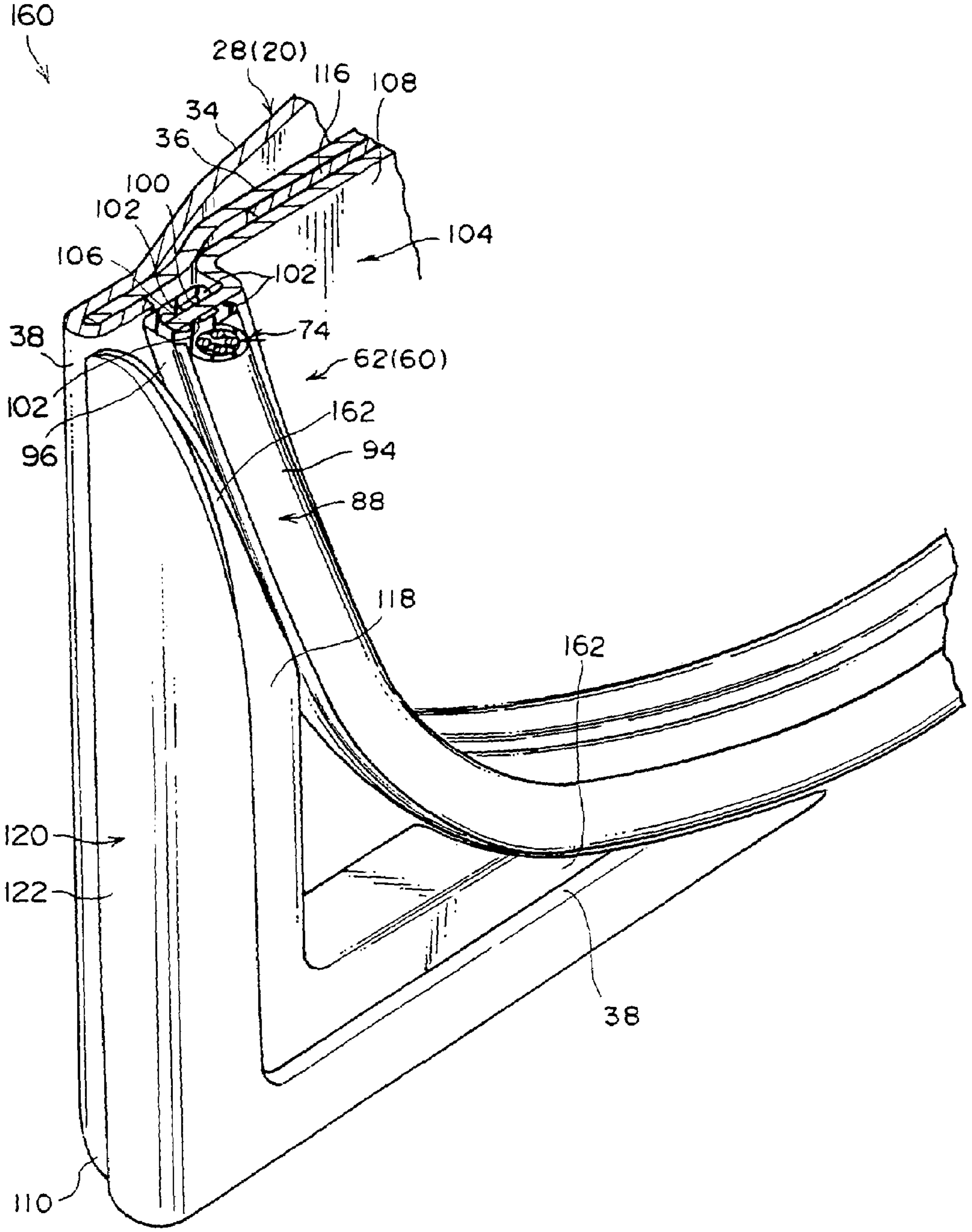
FIG. 12 is a perspective view corresponding to FIG. 4 and showing structure of principal elements of an opening and closing apparatus relating to a second embodiment of the present invention.

FIG. 12 shows principal structure of an automatic back door apparatus 160, which serves as an opening and closing apparatus relating to the present embodiment, in a perspective view corresponding to FIG. 4.

As shown in FIG. 12, at the automatic back door apparatus 160, extension pieces 162, which structure the support portion 118 and the second support portion, protrude along the peripheral direction of the door side portion 28 from both of end portions of the support portion 118. The pressure sensor 62 is disposed sideward of the extension pieces 162, and the pressure sensor 62 gradually approaches the hem portion 38 toward the distal end side of each extension piece 162. Accordingly, the extension pieces 162 are formed so as to be gradually tapered, so as not to interfere with the pressure sensor 62.

Further, in this automatic back door apparatus 160, the pressure sensor 120, which serves as the second pressure sensor and is assembled to the support portion 118, is assembled so as to protrude to the extension piece 162 sides. Moreover, both end sides of the pressure sensor 120 along the peripheral direction of the door side portion 28 are formed so as to taper similarly to the extension pieces 162.

In the present embodiment too, similarly to the first embodiment, the pressure sensor 62 is broadly curved so as to keep away from the corner portion 110. Accordingly, the pressure sensor 62 is displaced to the rearward side relative to the hem portion 38, so as to gradually, from above the corner portion 110 toward a lower side, become distant from the corner portion 110.

Now, in the present embodiment, each of the extension pieces 162 protrudes from the support portion 118 as far as a vicinity very close to a portion at which the pressure sensor 62 shifts rearward relative to the hem portion 38, and the pressure sensor 120 protrudes as far as this extension piece 162. Therefore, in a case in which the foreign body 140 is trapped at the portion at which the pressure sensor 62 begins to shift rearward, even when this trapping cannot be detected by the pressure sensor 62, the trapping of the foreign body 140 can be detected by the pressure sensor 120.

That is, in the present embodiment, by protruding the extension pieces 162 from the support portion 118 and extending the pressure sensor 120 as far as the extension pieces 162, "dead zones", at which trapping detection of the foreign body 140 is difficult, can be made smaller. Thus, trapping of the foreign body 140 can be more reliably detected.

In each of the embodiments described above, the pressure sensor 120 serving as the second pressure sensor has a structure including the pair of electrode sheets 124 and 126. However, the structure of the second pressure sensor is not limited thus. For example, a piezoelectric element could be substituted for the pressure sensor 120 to serve as the second pressure sensor.

Further, each of the embodiments described above has a structure in which the pressure sensors 62 and 120 are disposed along the outer periphery portion of the back door 20. However, structures are also possible in which the pressure sensors 62 and 120 are disposed at the vehicle body, along the inner periphery portion of the rear gate 18, that is, the rear ends of the side walls 26, the inner faces of the lamp housings 24 and the rear end of the floor panel 32. Further, structures are also possible in which one of the pressure sensor 62 and the pressure sensor 120 is disposed along the outer periphery portion of the back door 20 and the other is disposed along the inner periphery portion of the rear gate 18 at the vehicle body.

Further yet, each of the embodiments described above has a structure in which the present invention is applied to the automatic back door apparatus 10 of the vehicle 12. However, the present invention is not limited to the automatic back door apparatus 10. That is, the present invention may be applied as an opening and closing apparatus for opening and closing a luggage door of a vehicle such as a sedan or the like, and the present invention may be applied as an opening and closing apparatus for a door panel at a side portion of a vehicle. Further still, besides road vehicles, the present invention could just as well be applied to automatic doors of buildings, railroad vehicles and the like.

As has been described above, with an opening and closing apparatus relating to the present invention, detection of trapping of foreign objects at an outer periphery portion of a moving body, an inner periphery portion of a gate or the like, which includes corner portions, can be performed reliably.

What is claimed is:

1. An opening and closing apparatus comprising:

a body portion including a gate;

a closure provided at the body portion and capable of opening and closing the gate;

a first pressure sensor disposed along a peripheral edge of at least one of the gate and the closure, the first pressure sensor including a curved portion;

a second pressure sensor disposed between the peripheral edge and the curved portion of the first pressure sensor; and a control apparatus that controls opening and closing of the closure in accordance with operation of at least one of the first pressure sensor and the second pressure sensor.

2. The opening and closing apparatus of claim 1, wherein the control apparatus comprises a driver that drives the opening and closing of the closure.

3. The opening and closing apparatus of claim 1, wherein the control apparatus further comprises a controller that controls driving for opening and closing the closure.

4. The opening and closing apparatus of claim 1, wherein the closure is made to stop at a time of operation of at least one of the sensors.

5. The opening and closing apparatus of claim 1, wherein the closure is driven in an opening direction at a time of operation of at least one of the sensors.

6. The opening and closing apparatus of claim 1, wherein the first pressure sensor comprises an insulative body including a hollow transverse cross-section, and at least two long cord form electrodes disposed in helical forms along an interior face of the insulative body so as to usually be non-conductive with one another.

7. The opening and closing apparatus of claim 1, wherein the second pressure sensor comprises a plate-form insulative body including a hollow transverse cross-section, and two sheet-form electrodes disposed at opposing interior faces of the insulative body so as to usually be nonconductive with one another.

8. The opening and closing apparatus of claim 1, wherein the body portion includes a body of a vehicle, and the closure includes a door.

9. The opening and closing apparatus of claim 1, wherein the closure operates by swinging.

10. The opening and closing apparatus of claim 1 wherein the second pressure sensor is provided so as to approach both ends of the curved portion of the first pressure sensor.

* * * * *